US012794204B2

(12) United States Patent
Jávori et al.

(10) Patent No.: US 12,794,204 B2
(45) Date of Patent: Nov. 10, 2026

(54) SYSTEM AND METHOD FOR POSITIONING A MOVABLE ELECTRICAL SOCKET

(71) Applicant: SENSONIC DESIGN ZRT., Györ (HU)

(72) Inventors: Dávid Vilmos Jávori, Budapest (HU); Sándor Szabó, Budapest (HU)

(73) Assignee: SENSONIC DESIGN ZRT., Gyor (HU)

( * ) Notice: Subject to any disclaimer, the term of this patent is extended or adjusted under 35 U.S.C. 154(b) by 489 days.

(21) Appl. No.: 18/845,674

(22) PCT Filed: Jun. 23, 2022

(86) PCT No.: PCT/EP2022/067215
§ 371 (c)(1),
(2) Date: Sep. 10, 2024

(87) PCT Pub. No.: WO2022/268973
PCT Pub. Date: Dec. 29, 2022

(65) Prior Publication Data

US 2025/0038504 A1 Jan. 30, 2025

(30) Foreign Application Priority Data

Jun. 24, 2021 (EP) .................................... 21462002

(51) Int. Cl.
*H02J 50/90* (2016.01)
*H02G 3/10* (2006.01)
(Continued)

(52) U.S. Cl.
CPC ................ *H02G 3/18* (2013.01); *H02G 3/10* (2013.01); *H02J 50/12* (2016.02); *H02J 50/90* (2016.02)

(58) Field of Classification Search
CPC ... H02G 3/18; H02G 3/10; H02J 50/12; H02J 50/90
See application file for complete search history.

*Primary Examiner* — Timothy J Thompson
*Assistant Examiner* — Aditya Sharma
(74) *Attorney, Agent, or Firm* — Daniel S. Kim

(57) ABSTRACT

The system (100) for positioning a movable electrical socket (133) comprises at least one planar support element; on a first side of each support element, a rail system comprising fixed rails extending in a first direction and at least one second rail extending in a second direction perpendicular to the first direction and connected to the first rails, wherein the at least one second rail is motor-driven and movable in the first direction relative to the first rails; a power transmission transmitter (120) connected to each of the second rails, each of said transmitters (120) is motor-driven and movable in the second direction along said second rail, and which transmitter (120) comprises a magnetic retainer (122); on each side of each support element opposite the first side thereof, at least one energy receiving receiver (130) comprising an electrical socket (133) and wirelessly connected to the transmitter (120) by resonant inductive coupling for receiving electrical energy to power an electrical appliance connected to said electrical socket (133), said receiver (130) being in a magnetic engagement through a magnetic retainer (132) with the magnetic retainer (122) of the transmitter (120) and is movable in a fixed position relative to said movable transmitter (120); a power transfer control unit (140) for supplying electrical power to the transmitter (120); a motion control unit (150) for operating the motor (107; 121) of the at least one second rail and the associated transmitter (120). The system further comprises a camera system (160) comprising cameras (162) for monitoring the movement of a user in the space defined by the second side of the at least one planar support element; a central computer (170) for receiving signals from the cameras (162) and determining at least the spatial position of the user on the basis of images provided by the camera system (160), the central computer (170) is configured to generate motion (Continued)

Figure 1:
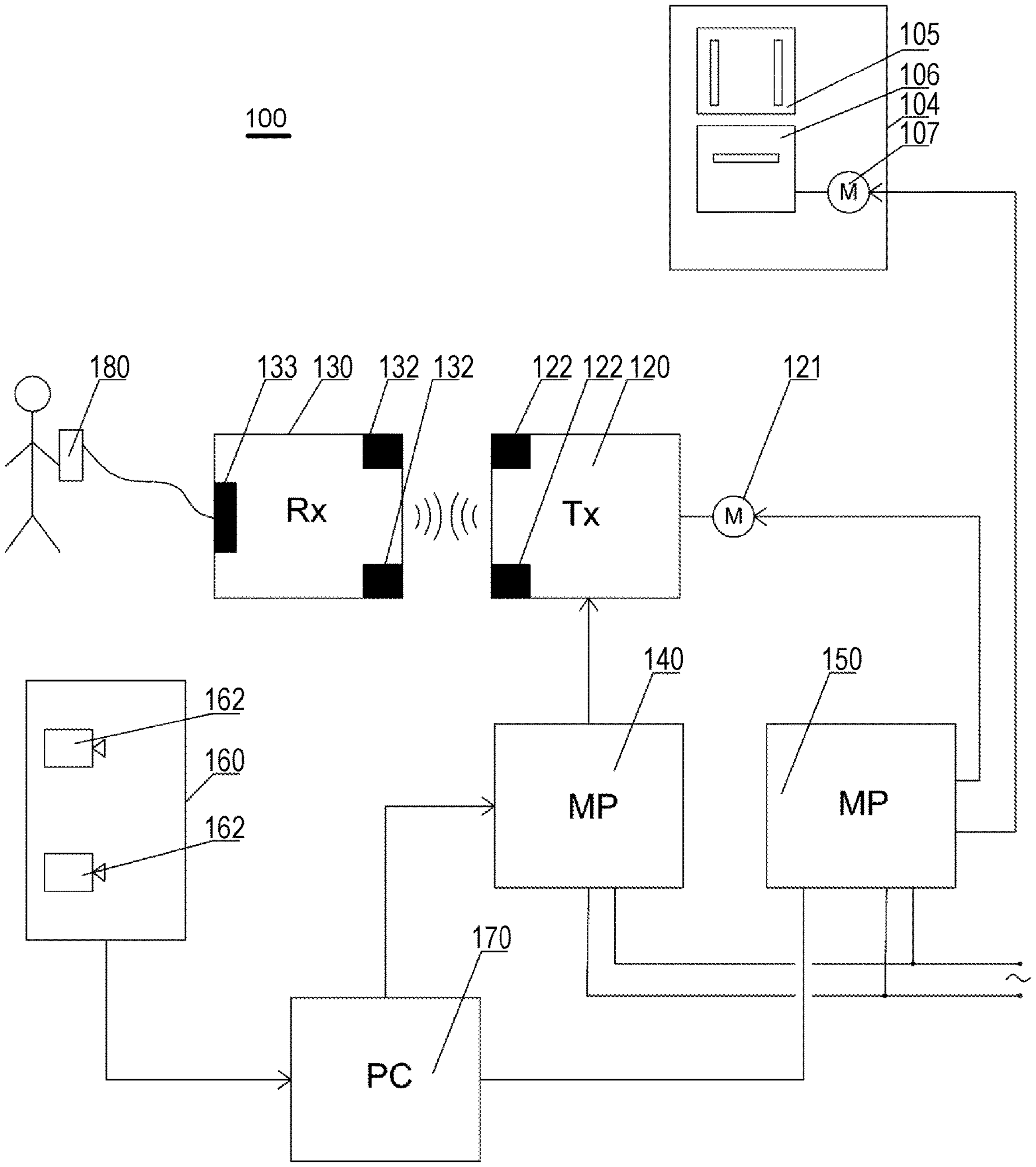

control signals for the motors (107; 121) of the second rail and the transmitter (120) based on at least the spatial position of the user and to send said motion control signals to said motion control unit (150) for moving the transmitter (120) into a target position according to the spatial position of the user, and further to send power control signals to the power transfer control unit (140). The central computer (170) is programmed to drive the motors (107; 121) of a second rail (106) and a transmitter (120) for moving the transmitter (120) along the support element so that the receiver (130) magnetically attached to the transmitter (120) always stay within a predetermined distance from the user.

6 Claims, 4 Drawing Sheets

(51) Int. Cl.
*H02G 3/18* (2006.01)
*H02J 50/12* (2016.01)

SYSTEM AND METHOD FOR POSITIONING A MOVABLE ELECTRICAL SOCKET

This is the national stage of International Application PCT/EP2022/067215, filed Jun. 23, 2022.

The present invention relates to a system and method for positioning a movable electrical socket. In particular, the present invention relates to a system and method that provides a continuous power supply to a user-operated portable electrical device following a user's movement by means of a mobile power transmitter unit located behind a wall cover and a mobile power receiver unit located on the front side of the wall cover, to the electrical socket of which the portable electronic device is connected by wire.

According to the current state of the art, the supply of mains energy, typically electricity, to a household energy consumer, such as an electrical appliance, requires a metallic contact to be established between the mains connection point and the electrical appliance. The most common way to do this is to connect the appliance to the mains via an electrical cable. At the connection point, the connector at the end of the wire, typically a plug, must be connected to a connector at the built-in mains connection point, typically a socket to provide a metallic contact. In Europe, the widespread standard CEE 7/3 socket and CEE 7/4 plug are used, while in the Americas, the Type A socket and Type B plug are used to connect electrical appliances to the mains.

For charging portable electrical devices, primarily mobile phones and body-worn devices, low-power wireless chargers have been developed that allow (slow) charging of the connected devices in the 5-10 W power range. Such wireless charging is provided, for example, by the "Qi" standard chargers and phones. Although these chargers can be placed in a support surface (e.g. a worktop), semi-concealed, they cannot be moved and thus do not allow the continuous (in-motion) operation of typical portable household electrical appliances.

Two types of inductive coupling can be used for short-range wireless transmission of electricity: simple (standard) inductive coupling or resonant inductive coupling.

In general, at relatively short distances, standard inductive coupling is less efficient and viable because the magnetic flux is scattered away from the coil serving as the energy source and only a small portion of the energy emitted by the transmitter is coupled to the coil of the receiver.

Resonant inductive coupling operates with higher efficiency than standard inductive coupling (here the transmission efficiency is about 95%) and is effective at relatively longer distances, even at a distance of a few meters. Thus, by using a resonant inductive connection, the energy loss can be significantly reduced and electrical energy can be transferred between the individual coils with acceptable efficiency.

High-performance resonant energy transfer devices are currently used primarily to charge batteries in electric vehicles (e.g., passenger and truck vehicles, forklifts, work machines, etc.) as an easy-to-handle alternative to metallic contact charging. However, the disadvantages of this mode of energy transfer are that the vehicles cannot move during charging, the charger and the vehicle must be positioned relatively accurately, and the vehicles cannot be operated during charging.

Thus, there is a need for an energy supply system in which the electrical device is energized during operation and can be moved in the usual way during energy consumption, but the energy intake is not stationary, and thus the use of the device allows much greater mobility.

The document US2010219183 describes a widely used power supply system. The system includes inductive transmitters built behind a wall and inductive receivers on the front side of the wall facing the living space. The receiver on the front side of the wall has a conventional (standard) socket that can be connected to a standard plug used in the given country. The receiver can be moved freely along the wall surface during use and detached from the wall when not in use. The transmitters behind the wall have a suitable positioning mechanism. The positioning mechanism includes motor-driven carriages with positioning tools that can be moved along a rail system. Locating the carriages and positioning them properly for the receiver can be accomplished in a variety of ways, such as mechanically with infrared proximity sensors. The carriages on the back of the wall can be moved in a motorized way to the appropriate position by moving the off-wall receiver or using a control panel. Cameras that monitor the space behind the wall can also be used to determine the position of carriages carrying the transmitters (i.e. tracking the carriages). The disadvantage of this solution is that the cameras are used at most to track the movement of the carriages, i.e. tracking the user's position with cameras and using the tracking information for control is not solved.

It is an object of the present invention to eliminate the above-mentioned problems.

The objects are achieved by the system according to claim 1 and the method according to claim 6. Preferred embodiments of the system and method of the invention are defined in the dependent claims.

Figure 2:
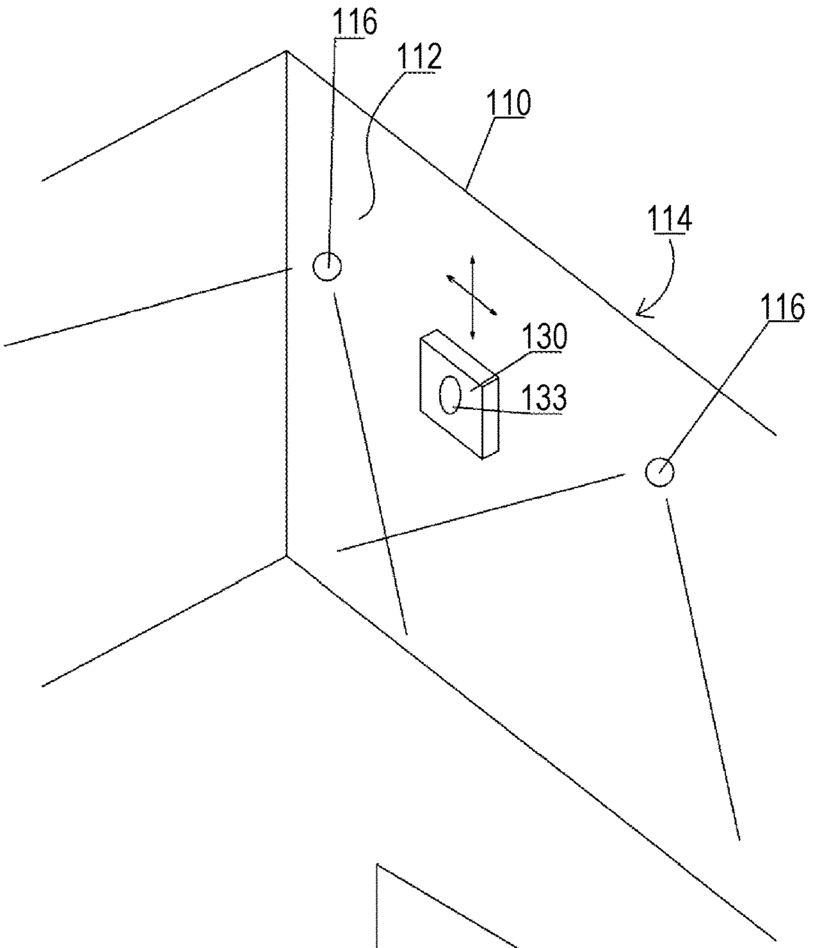
Figure 3:
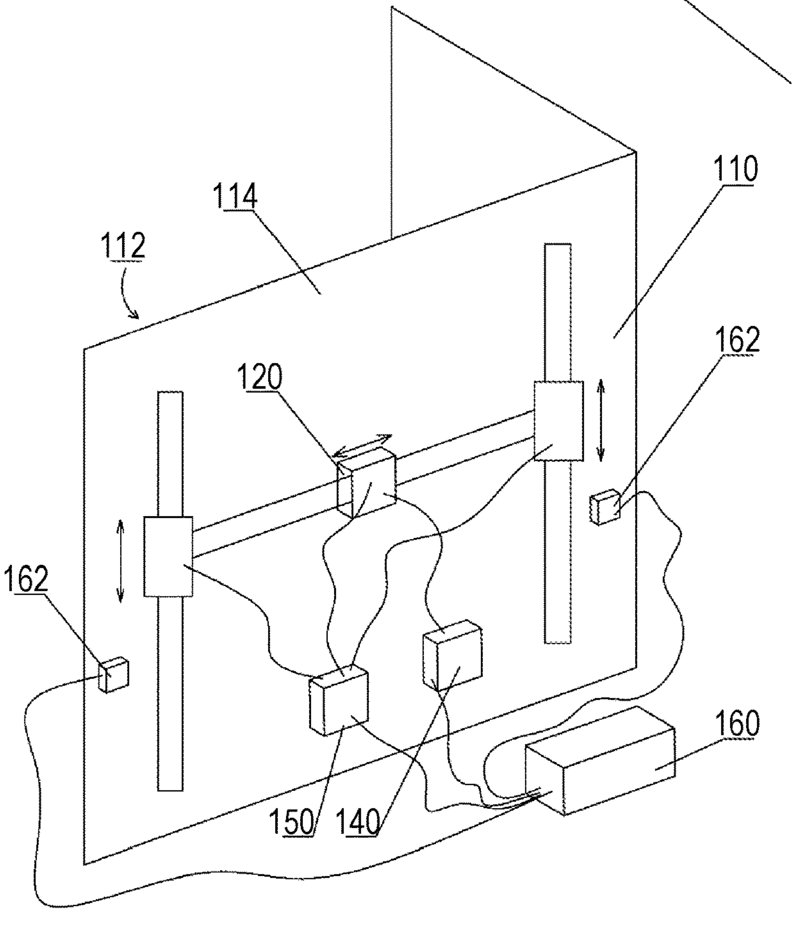
Figure 4:
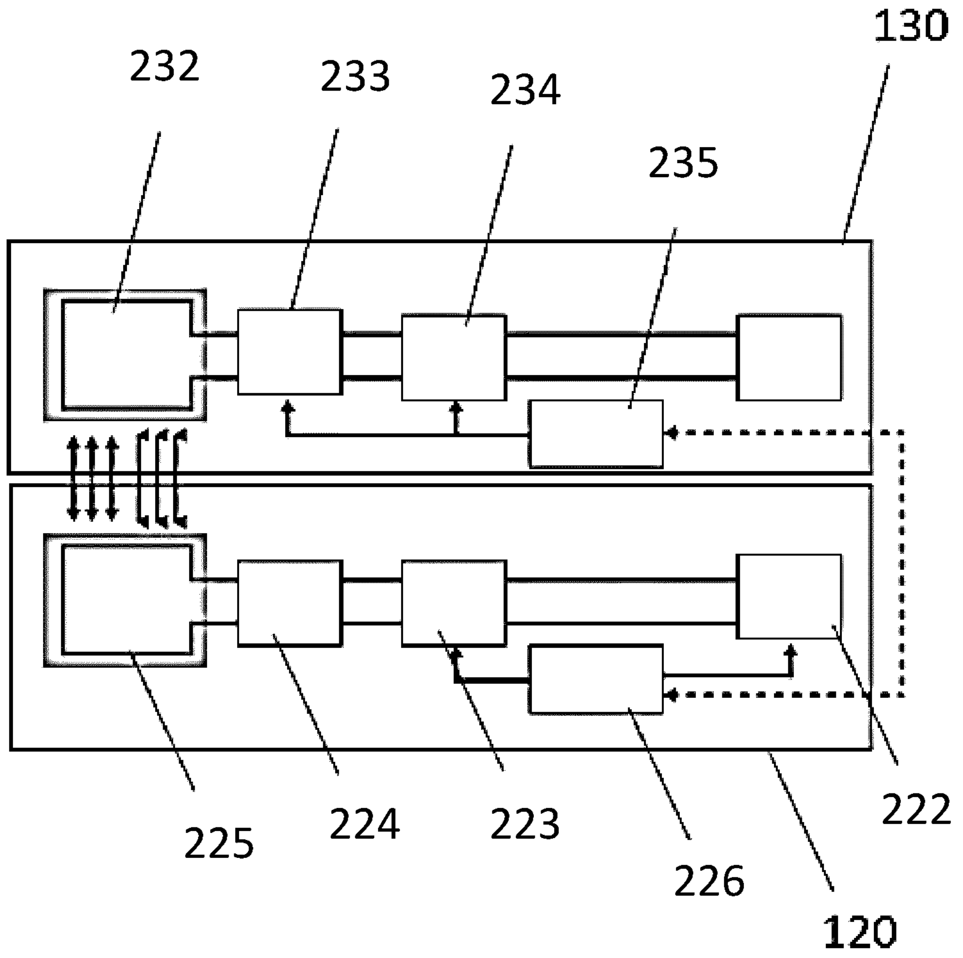
Figure 5:
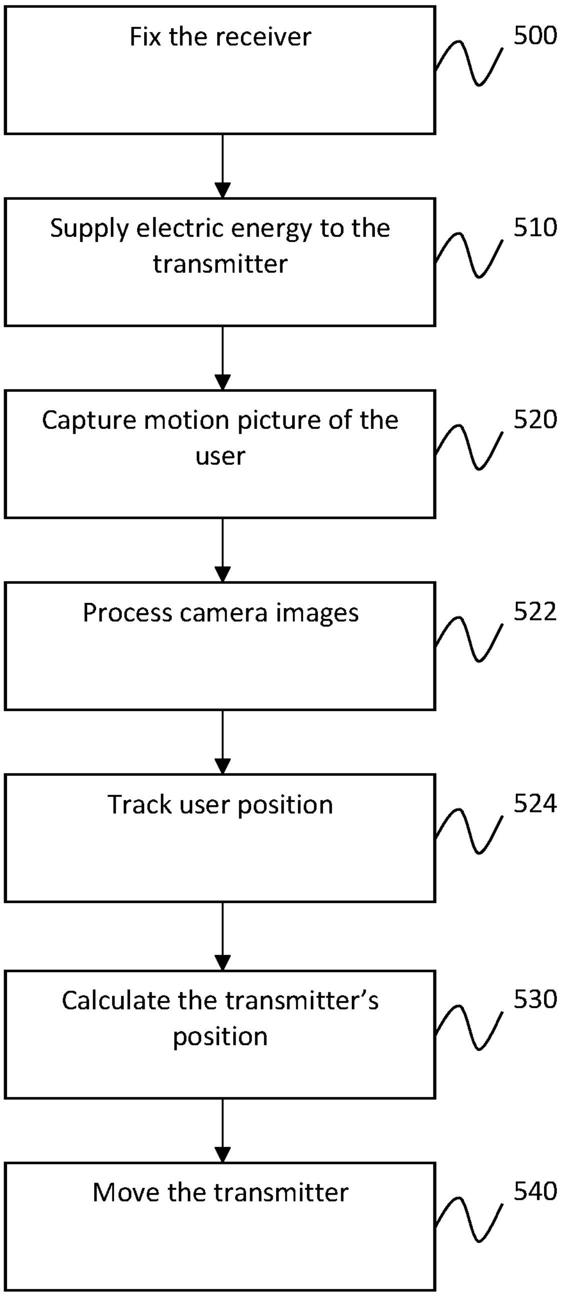

The invention will now be described in more detail with reference to the drawings. In the drawings:

FIG. 1 is a functional block diagram of a system according to the invention;

FIG. 2 schematically illustrates the elements of the system according to the invention on the front side of the support element;

FIG. 3 schematically illustrates the elements of the system according to the invention on the back side of the support element;

FIG. 4 illustrates the main circuit elements and their connections within the transmitter and the receiver used in the system according to the invention; and FIG. 5 is a flow chart illustrating the main steps of operating the system according to the invention.

As shown in FIGS. 1 to 3, according to the invention, the system 100 comprises at least one planar support element 110, on a first side 112 of which, namely on its back side hidden from the user, the mechanical elements necessary for power supply are arranged, in particular a transmitter 120 for wireless power transmission, a rail system 104 for moving the transmitter 120, a power transfer control unit 140 for controlling the power supply, a motion control unit 150 for controlling the movement of the transmitter unit 120. On a second side 114 of the support element 110 opposite to the first side 112, i.e. on the side facing the room used by the user, and a receiver 130 with en electrical socket 133 can be arranged movable along the surface of the support element 110. A particular support element 110 is typically provided with one transmitter 120, but a support element 110 with a larger surface area may have more than one transmitter 120, however, in this case, each transmitter 120 has a predetermined and non-overlapping service area.

The rail system 104 includes fixed first rails 105 extending in a first direction, typically running vertically, and second rails 106, arranged in a second direction perpendicular to the first direction, typically horizontally, wherein the second rails 106 are connected to the first rails 105. The second rails 106 are provided with a motor 107 which allows the second rails 106 to be moved in the first direction relative to the first rails 105.

Each second rail 106 is connected to a resonant transmitter 120. Each of the transmitters 120 is provided with a motor 121 which allows the transmitter 120 to be moved in the second direction along the second rail 106 relative to the respective second rail 106. The transmitters 120 further include a magnetic retainer 122 that can be magnetically attached to a respective magnetic retainer 132 of the receiver 130 located on the other side of the support element 110. In use, the transmitter 120 and the receiver 130 residing on the opposite sides of the support element 110 are in close proximity to each other and are in a fixed position relative to each other by the magnetic retainers 122 and 132, respectively, i.e. the receiver 130 moves together with the transmitter 120 when this latter is moved.

The power supply of the transmitter unit 120 is provided by a power transfer control unit 140 connected to the electricity distribution network, which also monitors the operation of the transmitter 120. On the one hand, the power transfer control unit 140 provides high-power electricity to the transmitter 120 when the transmitter 120 is active, i.e., when a receiver 130 is connected to it in a wireless manner, and also continuously supplies power to the transmitter's 120 own operating circuits. The power transfer control unit 140 supplies electrical energy to the transmitter 120 via an electrical line, preferably a flexible swing line with adequate mechanical protection and a plastic cable guide.

The movement of the transmitter 120 is controlled by the motion control unit 150 by actuating the motor 121 of the transmitter 120 and the motor 107 of the rail 106, respectively. The motors 107, 121 are preferably two-way stepper motors which, by means of a rack belt drive, move the transmitter 120 or the movable rail 106 to the target position. The target position of a transmitter 120 is defined the position into which the receiver 130 with the electrical socket 133 is to be moved on the basis of the motion of the user operating an electrical appliance powered through the electrical socket 133. Both the X coordinate (second direction) and the perpendicular Y coordinate (first direction) have control motors 107 and 121, respectively, so that the transmitter 120 can be moved to any position behind substantially the entire surface of the support element 110. However, for technical reasons, it is advisable to leave a safety zone of a certain width (e.g. 20 cm) at the edges of the support element 110, into which the transmitter 120 cannot enter. The motion control unit 150 is preferably connected to the motors 107, 121 by means of swing lines which together transmit electrical energy and control signals.

The rail system 104 is preferably made of a wear-resistant, high mechanical strength metal alloy and is mechanically attached to the support element 110, which may be a sufficiently solid wall surface or a specially designed support structure, bracket, but may be a vertical or horizontal piece of furniture such as a table top, worktop, etc. It is preferred that the rail system 104 protrude only a few centimeters from the flat surface 114 of the back side of the support element 110 due to its flat design.

In a preferred embodiment of the system 100 according to the invention, the transmitter 120 is, in its idle state, at a certain preset comfort height according to the field of application. This idle position can be, for example, 30 cm above the floor level in the case of a free-standing installation, while the target positions that can be taken during use are limited, for example, to values within the height range of 30-160 cm. In the case of a kitchen installation, the idle position can be, for example, a height of 80 cm measured from the floor level and a height range of 80-140 cm during use, obviously taking into account the height-limiting effect of the kitchen counters.

The motion control unit 150 controlling the movement of the transmitter 120 is preferably pre-programmed with the corresponding in-plane coordinates of the areas that the transmitter 120 must avoid during its movement in order for the receiver 130 connected to it to follow its movement.

The transmitter 120 is wired to the electrical distribution network at the installation site (e.g., home, office, etc.) via the power transfer control unit 140 and receives the electrical energy required for its own operation and for the operation of the electrical device 180 connected via the receiver 130 through this connection.

The main circuit elements of the resonant inductively coupled pair of a transmitter 120 and a receiver 130 used in the system of the present invention and their connection are illustrated in FIG. 4. The transmitter 120 includes a power supply unit 222 supplied from the electrical distribution network, which is connected to a resonator circuit 225 via a power amplifier 223 and an impedance matching circuit 224. The transmitter 120 also includes its own control circuit 226 that controls the operation of the power supply 222 and the power amplifier 223 and communicates with the receiver 130 via out-of-band signaling (e.g., at 2.4 GHZ). The transmitter 120 is preferably connected to the mains by a single-phase connection via a circuit breaker.

The receiver 130 receives the energy provided by resonant inductive coupling by means of a resonator circuit 232 in a wireless manner. The energy is then transmitted as electrical energy to a user-connected electrical appliance 180 via a control circuit 233 for controlling the power delivered by the transmitter 130 to the electrical appliance 180 and a DC-DC converter circuit 234. The operation of said circuit units is controlled by a dedicated control unit 235, which is also responsible for the two-way communication with the transmitter 120. The control units 226 and 235 communicate with each other wirelessly and thus the operation of the transmitter circuit is controlled as a function of the load.

The transmitter 120 preferably has a plastic case, which is advantageous for the unobstructed emission of electromagnetic radiation. The transmitter 120 preferably has mechanical protection of IP65, IP66 or IP67, i.e. it is fully protected against dust and protected against water jets or immersion for a limited time.

The transmitter 120 is preferably designed to be flat in order to minimize the depth required for mounting the rail system 104 and the movable transmitter 120 when installed behind a support element 110, such as a wall structure or wall cladding, and to leave sufficient space behind the rail system 104 for the installation of other building services equipment.

The receiver 130 located on the front side 112 of the support element 110 includes the aforementioned receiver-side circuits, a socket 133 for metallic connection of the electrical appliance 180, and a magnetic fixing unit 132. The socket 133 is preferably of a standard design so that any conventional household electrical appliance can be connected to it.

The optimum operating frequency of the system 100 of the present invention (i.e. the resonant frequency used) depends primarily on the magnitude of the power of the electrical appliance 180 to be connected. For devices with a power of a few watts, the optimal operating frequency is approximately in the range of 1-5 MHz, for higher powers, such as 200-1000 Watts, power supplies can be operated efficiently only in the range of a few hundred kHz. The operation of the system 100 with optimal parameters is provided by a PID controller implemented by the control circuit 233 of the receiver 130. To ensure accurate power transfer, the amplitude of the current in the primary coil in the receiver 120 can be varied by the PID controller with a resolution of a few mA.

The system of the present invention further includes a camera system 160 that includes at least two cameras 162 for tracking the movement of a user using the electrical appliance 180 in a space defined by the support elements 110, such as a home or office room. Based on the images of the cameras 162, a central computer 170 connected thereto determines the user's movement parameters, in particular the user's current spatial position, and optionally also the current spatial speed of the user, and may also determine the spatial position of the energized electrical appliance 180 relative to the support element 110 containing the active receiver 130 in use, e.g., its height from the floor and its distance from the support element, and based on this information, instructs the motion control unit 150 to generate motion control signals for moving the receiver 120 on the back side 114 of the support element 110 so that it be always close to the user, thereby always keep the receiver 130 on the front side (user side) 112 of the support element close to the user.

The system 100 of the present invention preferably uses colour cameras 162 which, in a particularly preferred embodiment of the system 100, are mounted on the back side 114 of the support member 110 in a hidden way by having an optical sensor in a space defined by the front sides 112 of the support member 110, such as a living room or monitor office space. For this purpose, openings 116 of suitable size must be formed on the support element 110, preferably as concealed as possible. For example, if the support member 110 is formed as a wall structure composed of clad panels, the interior space in front of the wall structure may be sensed through a narrow bore formed in the spacing of each panel, e.g., 6-8 mm wide. Although the operation of the system 100 of the present invention may be provided for a particular room by the use of two suitably positioned cameras 162, in one preferred embodiment of the system 100, two or more of the support elements 110 defining the room used by the user include at least two cameras 162 that are preferably located on the left and right edges of a given support element 110, preferably 1-1.5 m in height when two cameras are used. When more than two cameras per support element are used, the cameras 162 are evenly distributed. According to a particularly preferred embodiment of the system 100 according to the invention, the one or more support elements 110 may comprise two additional cameras at the lower and upper edges of the support element 110. By means of the cameras 162 used in pairs (right and left and bottom and top), the position of the users and the objects in the room (e.g. furniture, portable electrical appliance in use, etc.) can be determined in three dimensions. If two or more support elements 110 include cameras 162, the camera system 160 is capable of blind-spot detection of the entire interior of the room and thus tracking the movement of the portable electrical appliance 180 as accurately as possible and, accordingly, optimally moving the receiver 130. Object identification, spatial positioning and motion tracking with two or more cameras are well known to those skilled in the art, and their technical details will not be discussed herein.

In a preferred embodiment of the system according to the invention, the central computer 170 determines the posture and the head orientation of the user in addition to the spatial position of the user and the objects based on the images provided by the camera system 104, so that the system can have accurate information about the user's spatial orientation and can interpret movements, hand gestures, etc., which can even be used to control the operation of the system.

If each support element 110 has its own cameras 162, in a preferred embodiment of the system 100 of the present invention, the signals from the cameras 162 are first processed by a (hidden) local processing unit located on the back side 114 of the support element 110 connected to an internal wired communication network, for example, by communication using TCP/IP protocol. The locally processed image data of the cameras 162 are analysed by the central computer 170, also connected to said communication network, and determines at least the spatial position of the user, preferably relative to the support element 110. In a preferred embodiment of the system 100 of the present invention, the central computer 170 generates kinematic models of the people staying in the room based on the images obtained from the cameras 162, determines the spatial position and orientation of the users, and recognizes their control gestures, movements, and, optionally, the portable electric appliance 180, and it can also determine the spatial position and even the type of the appliance. The latter feature is important because the electrical power transmitted to the transmitter 120 can be controlled (e.g., limited) by the power transfer control unit 140 on the basis of power control signals from the central computer 170.

The operation of the system 100 according to the invention is as follows. When the user wishes to connect a portable electrical appliance 180 to the electrical distribution network, a dedicated wireless power supply unit, i.e. a receiver 130, must be placed at a designated point on the inner surface of a wall serving as the support element 110. Since the transmitter 120 is at said designated point in the idle position, the mounted receiver 130 is magnetically attached to the transmitter 120 through the wall. The success of the fixation and the communication with the hidden transmitter 120 on the back side of the wall is preferably indicated by the illumination of a control light, such as a green light, on the receiver unit 130. The plug of the portable electrical appliance 180 can then be connected to the standard socket 133 of the wall-mounted receiver 130. After the electrical appliance 180 is turned on, the transmitter 120 on the back side of the wall continuously supplies the required amount of electrical energy to the receiver 130 on the inside of the wall in a wireless manner, and the receiver 130 transmits the electrical energy to the portable electrical appliance 180 via a metallic contact, i.e. through wire.

While using the portable electrical appliance 180, the hidden cameras 162 of the camera system 160 continuously monitor the user's spatial location, movement and, optionally, the movement of the electrical appliance 180 and/or the user's movements and hand gestures, and the central computer 170 arranged on the back side of the wall continuously moves, by means of the rail system 104, the active transmitter 120 so that the receiver 130 magnetically attached thereto is located in the vicinity of the user, i.e. within a predetermined distance from the user, at all times.

When the user has finished using the electrical appliance 180, he or she unplugs the receiver 130 from the socket 133 and removes the receiver 130 from the wall. The transmitter 120 detects the removal of the receiver 130 by interrupting the communication between the control units 126 and 135, and then returns to its starting position (i.e., its idle position) by correspondingly operating the motors 107, 121 at the command of the central computer 170, where the receiver 130 resumes waiting for connection. In a preferred embodiment of the system of the present invention, a LED light source concealed on the back side of the support element 110 and dimly lighting through the support element indicates the parking location of the transmitter 120 so that the user can easily place the receiver 130 on the front side of the support element 110. In addition, if the user touches the receiver 130 at any point on the front surface of the support element 110, the central computer 170 moves the active transmitter 120 to the appropriate location based on the camera image using the rail system 104, so that the user does not necessarily have to place the receiver 130 in the idle position indicated by the LED light source.

The method according to the invention performs the positioning of the electrical socket in the above system. The main steps of the process are described below with reference to FIG. 5.

In the first step 500, one of the transmitters 120 in the idle position on the back side 112 of the support element 110 detects the magnetic fixation of a receiver 130 on the opposite front side 114 of the support element 110 near the transmitter 120, typically in a position substantially identical to the target position of the transmitter 120.

In the next step 510, electrical power is supplied to the transmitter 120 via the power transfer control unit 140, and then in step 520, two or more cameras 162 of the camera system 160 are used to capture images of a user staying near the support element 110.

In step 522, the images of the cameras 162 are continuously processed by the central computer 170, and in step 524, the user's spatial position relative to the support element 110 is continuously monitored using the information extracted from the images.

Following the user's movement, in step 530, the target position of the transmitter 120 is continuously calculated based on the user's current spatial position so that the distance between the user and the transmitter 120 does not exceed a predetermined value (e.g., 1.5 meters). Based on the target position of the transmitter 120, in step 540, motion control signals are sent from the motion control unit 150 to the motor 107 of the movable second rail 106 and the motor 121 of the transmitter 120, causing the motors to move the transmitter 120 to the target position. Because the transmitter 130 on the other side of the support element 110 is magnetically attached to the transmitter 120, it tracks its movement, thereby moving the receiver 130 and the electrical socket forming a part thereof along the support element 110. In this way, with the electrical appliance 180 connected by a wire to the receiver 130, the user can move freely in the room with the restriction that the electrical appliance 180 cannot move away from the support element 110 by a distance greater than the length of the wire.

One of the advantageous features of the system according to the invention is that the decorative appearance of the wall surfaces of the room is not adversely affected by electrical sockets, since the electrical appliances can be connected to a wall-mounted receiver which, can be placed in a closet.

A further advantageous feature of the system according to the invention is that it allows the user to move freely in the room even when using a portable electrical device, so that the user is not restricted in his movement by the length of the mains cable having a length of typically one to two meters.

A further advantage of the system according to the invention is that it does not require the purchase of new electrical hand-held devices, since the hand-held device's own cable can be easily connected to the receiver having a standard mains socket.

The invention claimed is:

1. A system (100) for positioning a movable electrical socket (133), the system comprising at least one planar support element (110);

on a first side (114) of each support element (110), a rail system (104) comprising fixed rails (105) extending in a first direction and at least one second rail (106) extending in a second direction perpendicular to the first direction and connected to the first rails (105), wherein the at least one second rail (106) is motor-driven and movable in the first direction relative to the first rails (105);

a power transmission transmitter (120) connected to each of the second rails (106), each of said transmitters (120) is motor-driven and movable in the second direction along said second rail (106), and which transmitter (120) comprises a magnetic retainer (122);

on each side (112) of each support element (110) opposite the first side (114) thereof, at least one energy receiving receiver (130) comprising an electrical socket (133) and wirelessly connected to the transmitter (120) by resonant inductive coupling for receiving electrical energy to power an electrical appliance connected to said electrical socket (133), said receiver (130) being in a magnetic engagement through a magnetic retainer (132) with the magnetic retainer (122) of the transmitter (120) and is movable in a fixed position relative to said movable transmitter (120);

a power transfer control unit (140) for supplying electrical power to the transmitter (120);

a motion control unit (150) for operating the motor (107; 121) of the at least one second rail (106) and the associated transmitter (120);

characterized in that the system further comprises a camera system (160) comprising cameras (162) for monitoring the movement of a user in the space defined by the second side (112) of the at least one planar support element (110);

a central computer (170) for receiving signals from the cameras (162) and determining at least the spatial position of the user on the basis of images provided by the camera system (160), the central computer (170) is configured to generate motion control signals for the motors (107; 121) of the second rail (106) and the transmitter (120) based on at least the spatial position of the user and to send said motion control signals to said motion control unit (150) for moving the transmitter (120) into a target position according to the spatial position of the user, and further to send power control signals to the power transfer control unit (140);

wherein the central computer (170) is programmed to drive the motors (107; 121) of one of said at least one second rail (106) and of the corresponding power transmission transmitter (120) for moving the transmitter (120) along the support element (110) so that the receiver (130) magnetically attached to the transmitter (120) always stay within a predetermined distance from the user.

2. The system of claim 1, wherein the support element (110) is a wall panel arranged in a vertical plane.

3. The system according to claim 1, characterized in that the support element is a furniture panel arranged in a horizontal plane.

4. The system according to claim 1, wherein the central computer (170) is further configured to additionally use one or more of the following parameters to calculate the target position of the transmitter (120): the user's spatial speed, the user's movement time duration, the spatial position of the electrical appliance connected to the receiver, the type of the electrical appliance.

5. The system according to claim 1, wherein the central computer (170) is further configured to use one or more of the following parameters to calculate the target position of the transmitter (120): the user's posture, in particular head orientation, the user's movement, the user's hand gesture.

6. A method of positioning a movable electrical socket in a system according to claim 1, characterized in that by means of one of the power transmission transmitters (120) in an idle position, detecting (500) magnetic fixation of a receiver (130) on the opposite side of the support element (110), near the transmitter (120), supplying electrical power (510) to the transmitter (120) via the power transfer control unit (140), capturing (520) images of a user staying in the vicinity of the support element (110) by means of two or more cameras (162) of the camera system (160), continuously processing (522) the images of the cameras (162) with the central computer (170) and continuously tracking (524) the user's spatial position relative to the support element (110) using information extracted from the captured images, while tracking the user's movement, continuously calculating (530) a target position of the transmitter (120) along the support element (110) based on at least the user's current spatial position so that the distance between the user and the transmitter (120) does not exceed a predetermined value, based on the target position of the transmitter (120), sending motion control signals (540) from the motion control unit (150) to drive the motor (107) of said power transmission transmitter (120) and the motor (121) of the corresponding movable second rail (106) for moving the transmitter (120) into the target position.

* * * * *